United States Patent [19]
Weber et al.

[11] Patent Number: 5,523,519
[45] Date of Patent: Jun. 4, 1996

[54] SYSTEM FOR FACILITATING SAFE TRANSFER OF HAZARDOUS MATERIAL

[75] Inventors: Robert J. Weber, Zumbrota; Carleton E. Jennrich, Welch; Rudolph O. Marohl, Red Wing, all of Minn.

[73] Assignee: Delaware Capital Formation, Inc., Wilmington, Del.

[21] Appl. No.: 274,977

[22] Filed: Jul. 14, 1994

[51] Int. Cl.[6] ............................................. B09B 1/00
[52] U.S. Cl. ...................... 588/249; 588/900; 141/314; 141/390; 141/391; 53/175; 53/483; 53/549
[58] Field of Search ..................... 588/249, 259, 588/258, 900; 141/314–316, 390–391; 53/370, 483, 549, 175, 449; 248/907

[56] References Cited

U.S. PATENT DOCUMENTS

| | | | |
|---|---|---|---|
| 4,010,588 | 3/1977 | Eisert | 52/398 |
| 4,545,540 | 10/1985 | Nakamura | 588/900 X |
| 4,670,227 | 6/1987 | Smith | 588/900 X |
| 4,761,127 | 8/1988 | Obrien et al. | 588/900 X |
| 4,917,393 | 4/1990 | Rogers | 53/370 X |
| 5,294,412 | 3/1994 | Orlando | 588/258 X |
| 5,328,028 | 7/1994 | Hale et al. | 588/258 X |

Primary Examiner—Ramon S. Britts
Assistant Examiner—Frederick L. Lagman
Attorney, Agent, or Firm—Burd Bartz & Gutenkauf

[57] ABSTRACT

A sealed system for facilitating the safe transfer of hazardous material through a port in the floor of a containment enclosure to an open topped storage container positionable in precise axial alignment below the port and supported on a lift cart for vertical movement toward and away from the port. The port is defined by a vertically depending flange or enclosure ring in the floor of the containment enclosure and is closeable by a seal cover within said containment enclosure positionable for sealing engagement with the periphery of the port. The port is also closed alternately by a sturdy plastic bag supported from a seal ring engageable in leak-proof sealed relation with the port and partially contained within the storage container supported on the lift cart. A succession of bags are positioned under the port, elevated into sealed relation with the port, filled, sealed shut, severed from the sealed port and lowered and removed for permanent storage.

25 Claims, 9 Drawing Sheets

SYSTEM FOR FACILITATING SAFE TRANSFER OF HAZARDOUS MATERIAL

BACKGROUND OF THE INVENTION

1. Field of the Invention

This invention relates to a sealed system for facilitating the safe transfer of hazardous radioactive or chemical or biological material or other hazardous material through a port in the floor of a containment enclosure to a storage container for transport to a permanent storage area. Through the years thousands of tons of low level radioactive and other hazardous waste material, often of unknown composition, has accumulated at temporary storage sites. There is now a mandated need to inspect and classify this hazardous material and repackage it for long term safe storage without contamination of the outside surfaces of the repackaged containers, or exposure of workmen to hazardous environments. The objective of the present invention is to accomplish these ends.

2. The Prior Art

Cazalis U.S. Pat. No. 3,289,698 discloses one means for effecting a leak-tight coupling between two environments without contamination of one by the other.

Eisert U.S. Pat. Nos. 4,010,588 and 4,141,609 disclose systems for effecting access into sealed enclosures, as with gloves, without exposing the interior of the enclosure to the outside atmosphere, or vise versa.

One commercially available system for the safe transfer of hazardous waste is the Double Lid System available from Radwaste Conditioning Ltd. of Wood Dale, Ill. 60191.

SUMMARY OF THE INVENTION

Broadly stated, the sealed system for facilitating the safe transfer of hazardous material through a port in the floor of a containment enclosure to a storage container, according to the present invention, comprises a vertically depending enclosure flange ring surrounding and defining a circular port in the floor of a hazardous material containment enclosure and a seal cover within the containment enclosure positionable for sealing engagement with the periphery of the port. An open topped storage container to receive hazardous material is positionable in precise axial alignment below the containment enclosure port. Elevator means are provided for supporting the storage container for vertical movement toward and away from the port. A disposable semi-rigid synthetic resinous bag supporting plastic sealing ring is provided on the top of the storage container to be engageable in leak-proof sealed relation with the inner periphery of the flange ring surrounding the port when the storage container is elevated. A complimentary rigid pusher ring is provided supportable on the open top of the storage container extending upward toward and, loosely engageable within the flange ring. An open topped flexible synthetic resinous elongated plastic bag is partially positioned with its closed end within the storage container and the open top end extending loosely through the pusher ring and in leak-proof sealed engagement with the bag supporting sealing ring. Means are provided for closing the open end portion of the plastic bag which extends between the sealing ring and pusher ring in leak-proof sealed condition after filling the bag with waste material. This sealed bag end is then severed from the sealed bag supporting ring and enclosed within the storage container. The lid of the storage container is replaced and the container is removed to a safe long term storage site.

BRIEF DESCRIPTION OF THE DRAWINGS

The invention is illustrated in the accompanying drawings in which corresponding parts are identified by the same numerals and in which.

DETAILED DESCRIPTION OF THE PREFERRED EMBODIMENT

Figure 1:
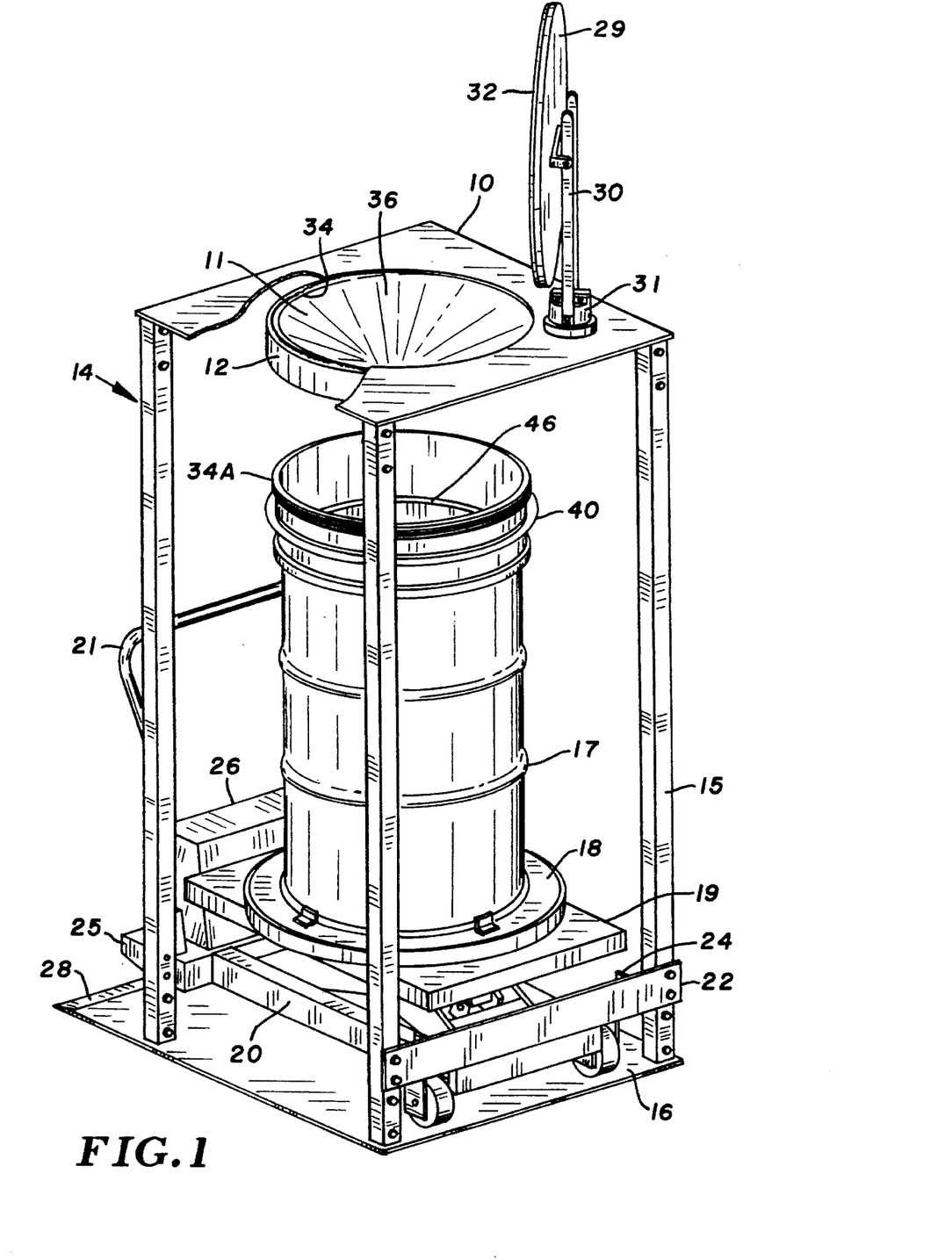
FIG. 1 is an isometric view of the structure comprising the safe transfer system of the present invention, shown at the beginning of a transfer cycle.

Referring now to the drawings, and particularly to FIG. 1, there is shown the structure by which hazardous material may be safely transferred from a containment enclosure or cell, not shown but having a floor portion in the form of a horizontal cell plate 10. The containment enclosure may range from a glove box to a room in which people clothed in protective garments may work. Cell plate 10 has a circular port opening 11 therein surrounded by a vertically depending flange or enclosure ring 12. Underlying port 11 is a rigid rectangular frame 14 comprised of four corner posts or legs 15 rigidly secured, as by welding, to a base plate 16. The top ends of legs 15 are secured, as by welding, to the lower surface of cell plate 10.

Frame 14 is precisely positioned relative to port 11 so that a storage container, such as a standard 55 gallon drum 17 may be precisely positioned in axial alignment with the port. Drum 17 is supported on a lazy susan type turntable 18, which in turn is supported on the elevator platform 19 of a wheeled mobile scissors type lift truck or cart 20. Lift cart 20 is provided with a handle 21 at one end to facilitate maneuvering of the cart. The elevator may be operated mechanically, hydraulically or electrically.

To ensure precise alignment of the lift cart aligner plate 22 is provided spaced from base 16 and spanning the pair of legs 15 defining the back of frame 14. A pair of horizontally spaced apart forwardly projecting vertical ears 24 on the inside surface of aligner plate 22 embrace the forward end of lift cart 20 for precise positioning when the cart comes to a stop against the aligner plate. Legs 15 are spaced apart so that the ends of platform 25 of lift cart 20 supporting the power unit 26 are received with a slide fit between the legs. Base 16 is preferably provided with a beveled ramp 28 to facilitate movement of the lift cart onto and off of the base.

Port 11 is provided with a seal cover or door 29 within the containment enclosure pivotally supported by a pair of arms 30 connected to a remotely controlled seal cover drive mechanism 31 which may be an electrically, pneumatically or hydraulically driven motor supported in leak-proof sealed relation in cell plate 10. Seal cover 29 is provided with an annular peripheral seal ring or gasket 32 which engages the periphery of port 11 when the cover is in its closed downward position.

Figure 2:
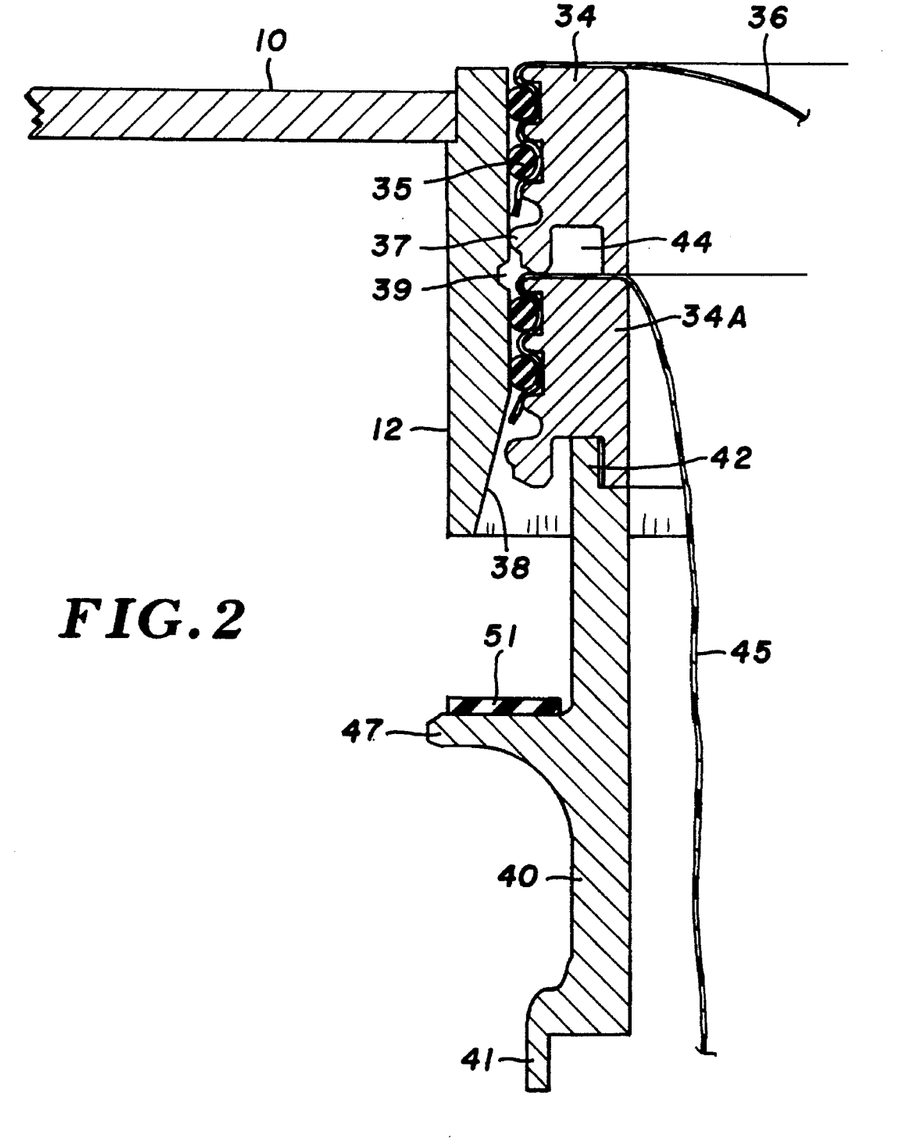
FIG. 2 is a fragmentary sectional view on an enlarged scale of the seal between the floor of a containment enclosure and the flexible hazardous material receiving plastic bag and the relationship of the pusher ring to bag supporting sealing ring.

A first or leading semi-rigid synthetic resinous disposable plastic bag support ring 34 is shown with its outer periphery in leak-proof sealed frictional engagement with the inner surface of enclosure ring or flange 12 surrounding port 11. As best seen in FIG. 2, ring 34 is provided with outer peripheral channels or grooves each adapted to receive a resilient compressible natural or synthetic rubber O-ring 35. Ring 34 supports a first bag 36, of which only the severed sealed upper end is shown in FIGS. 1 and 2. The open end of bag 36 is passed through ring 34 and folded back over its top against the outer periphery of the ring prior to installation of the O-rings 35 to ensure tight engagement between bag and ring. Ring 34 may preferably be formed from a material such as polyethylene or equivalent. Bag 36 is formed from a tough heavy gauge impervious leak-proof sheet or film material, such as polyethylene or equivalent.

Ring 34 has a depending peripheral lip or bead 37 whose outside diameter is slightly greater than the inside diameter of enclosure ring 12 so that the lip or bead is deformed slightly inwardly in engagement with the enclosure ring. The inner periphery of enclosure ring 12 is flared slightly at 38 to compress lip or bead 37 as ring 34 passes through the enclosure ring. Preferably the interior surface of enclosure ring 12 is provided with an annular channel 39 about mid-way between the ends of ring 12. Channel 39 is engageable by lip or bead 37 to ensure against accidental upward or downward displacement of the bag support ring.

A rigid reusable pusher ring 40 is provided firmly supported by the bead surrounding the open top of the drum storage container 17. As best seen in FIG. 2, pusher ring 40 is provided with a depending lip 41 engageable with the outer perimeter of the drum. Pusher ring 40 also has an upwardly extending lip 42 engageable in an annular channel 44 in the bottom edge of a bag support ring.

A second or following bag support ring 34A, which is identical in all respects to support ring 34 already described, is seated on top of pusher ring 40 with its bottom channel 44 in engagement with pusher ring lip 42. A second or following bag 45 is secured to support ring 34A by extending through the ring and being folded over the top of the support ring and secured by O-rings 35. The following bag 45 is of a length to extend from the bottom of the storage drum 17 when that drum is in its lowermost position to the port 11 with enough extra length or slack to permit twisting without rupturing, as described hereinafter. The excess bag length is folded or bunched near the top of the drum until the drum is lowered after filling.

A rigid or semi-rigid drum liner 46 is desirably provided within bag 45 when the contaminated material to be stored is of a nature that it might tear the bag. The drum liner 46 preferably has a bottom. It may be formed, for example, from polyethylene or equivalent plastic material.

Pusher ring 40 is also provided with an outwardly extending stop flange or lip 47 approximately midway between its ends. Upon elevation of the drum assembly flange 47 is engageable with the bottommost edge of enclosure ring 12 to limit the upward movement of the pusher ring and bag support ring. When this occurs the following bag support ring 34A displaces leading support ring 34 and bead 37 is in engagement with channel 39 on the interior of the enclosure ring 12.

The containment enclosure is usually maintained at negative pressure. When this is true, the upper surface of stop flange 47 is provided with a resilient sealing ring or gasket 51 engageable with the bottom lip of enclosure ring 12 to nearly equalize pressures on opposite sides of an empty bag 45 and prevent the bag from being sucked into the containment enclosure.

Figure 3:
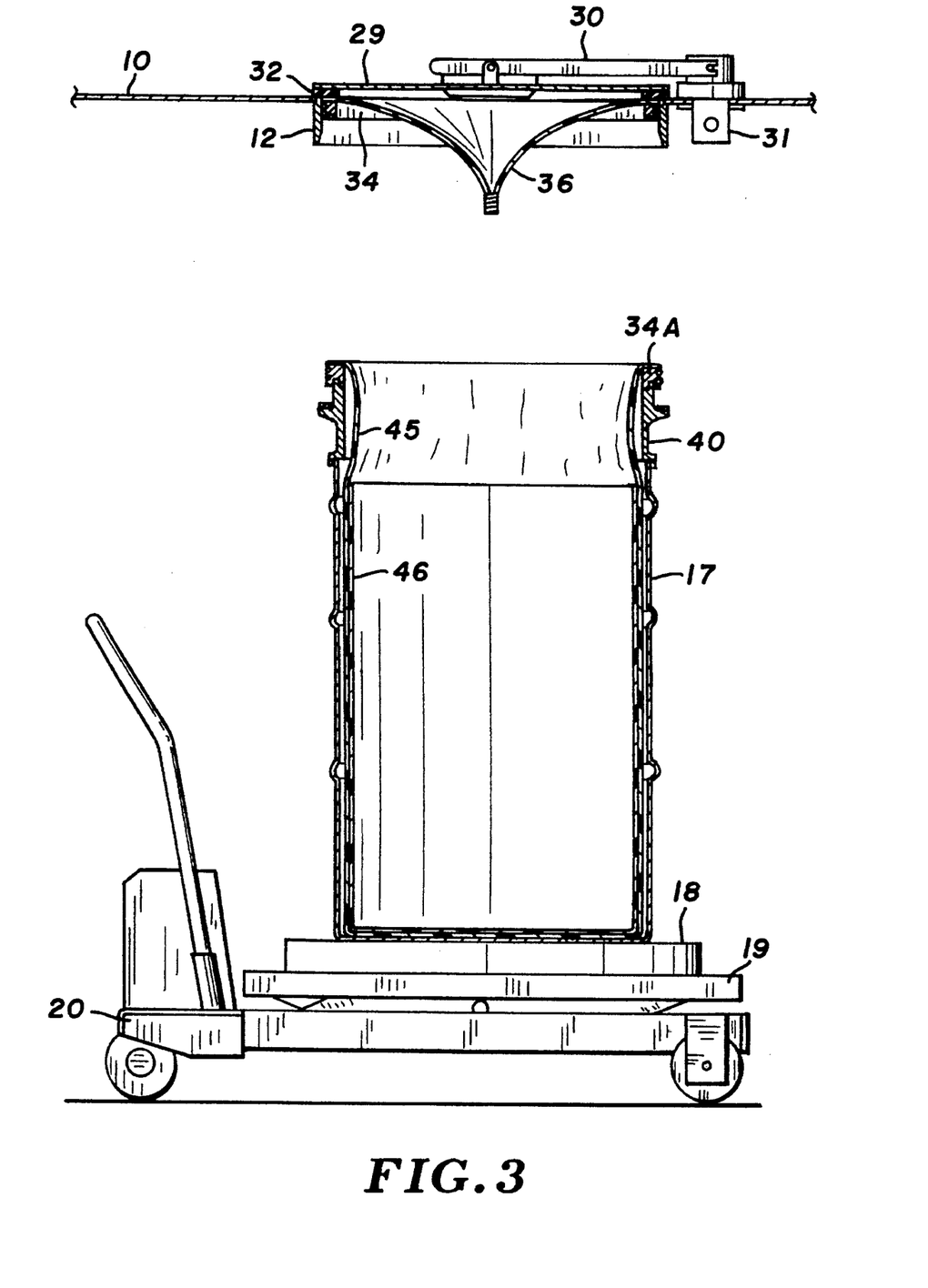
FIGS. 3 through 9 are schematic representations illustrating the successive steps of the safe transfer process.

Referring now to FIG. 3, the components of the transfer system according to the present invention are shown in their structural relationship at the beginning of a transfer cycle.

Port 11 to the containment enclosure is closed, sealed by gasket 32 in leak-proof sealed relation to the periphery of the port. The first or leading bag support ring 34 is in place in leak-proof sealed relation with the inner periphery of enclosure ring 12. Ring 34 supports the sealed severed top remnant 36 of a previously filled storage bag. A new storage drum 17 to be filled is precisely supported below enclosure ring 12 on a turntable 18 on elevator platform 19 of lift cart 20, with the elevator platform in its lowered position. A pusher ring 40 is supported on the open top of drum 17. A following or replacement bag 45 is supported from ring 34A situated on top of the pusher ring. Preferably bag 45 contains a liner 46.

Figure 4:
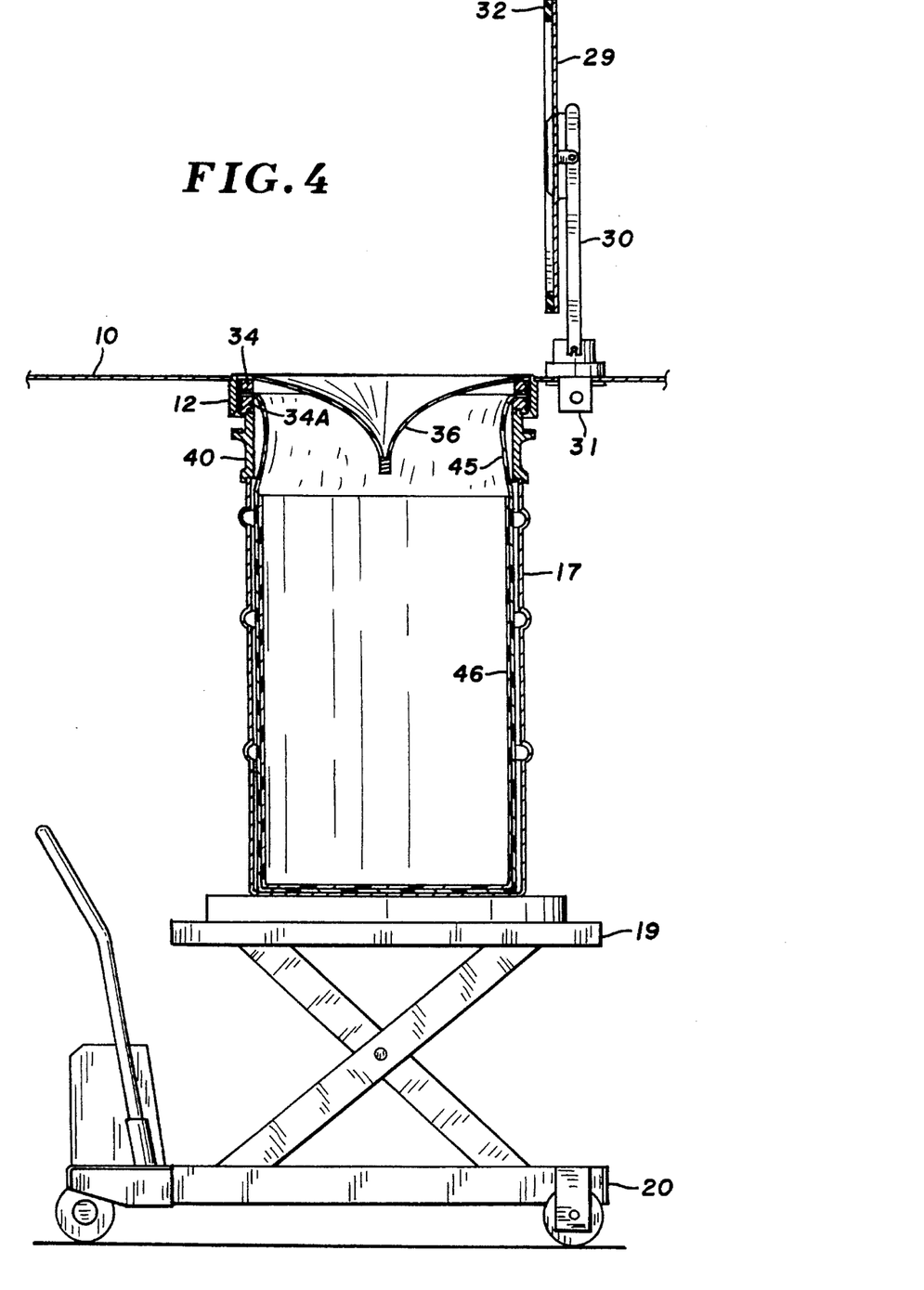

Referring now to FIG. 4, seal cover drive 31 has been actuated to lift the seal cover from the port in cell plate 10. The integrity of the seal is maintained by virtue of closed end bag remnant 36 maintained in leak-proof sealed engagement with enclosure ring 12. Drum 17 has been raised by actuation of elevator platform 19 of lift truck 20 to the point at which the top surface of bag support ring 34A, which is supported on the drum, engages the bottom surface of ring 34 supporting bag remnant 36.

Figure 5:
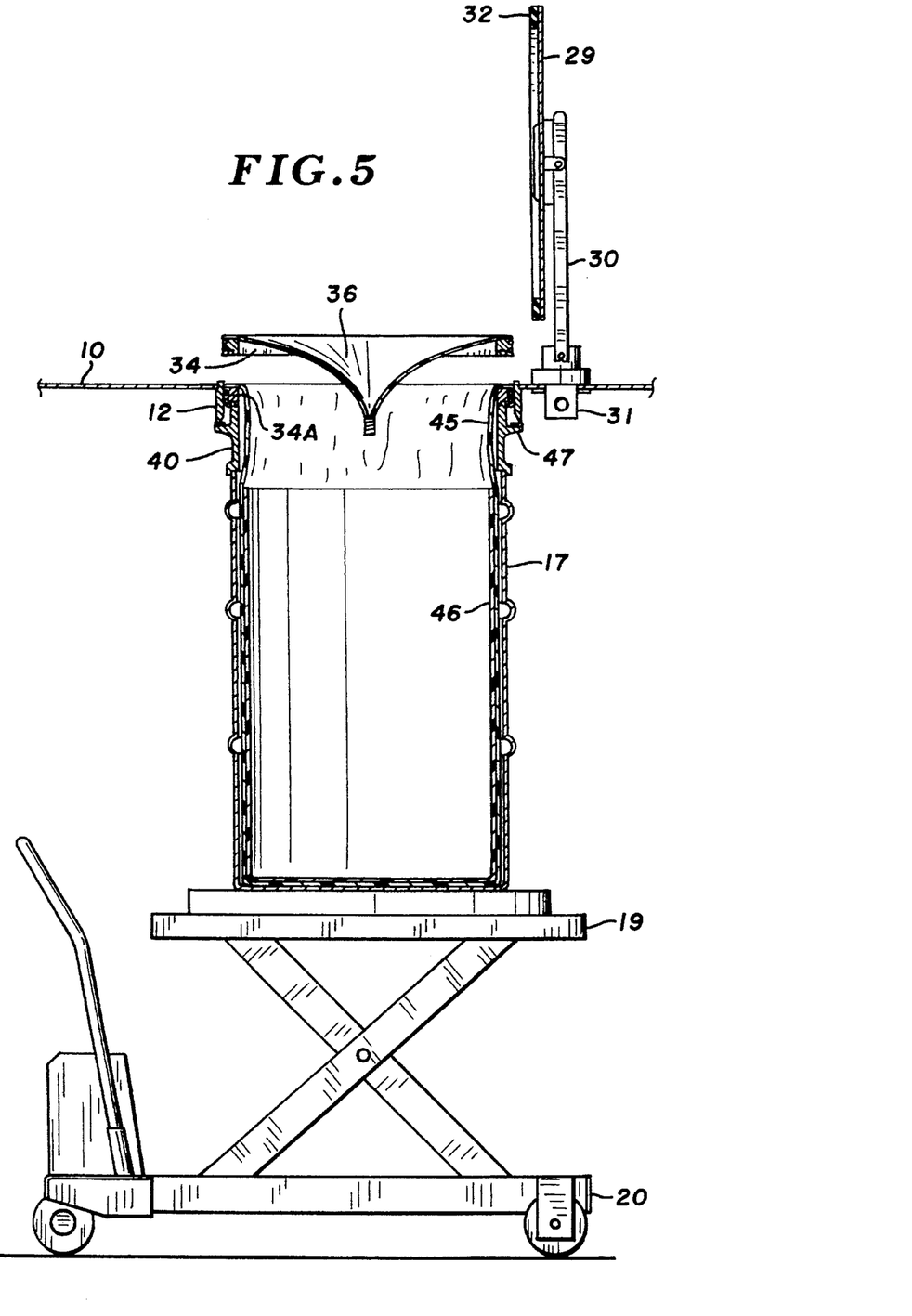

Referring now to FIG. 5, continuing raising of elevator platform 19 of lift cart 20 has caused drum 17 to be lifted to its maximum height. By virtue of the force exerted by the top of the drum on pusher ring 40 and by the pusher ring on bag support ring 34A, the first or leading bag support ring 34 is caused to pop out from its engagement with enclosure ring 12 and be replaced by the second or following bag support ring 34A. Ring 34A seals before ring 34 releases, maintaining the integrity of the seal throughout the transfer. The extent of travel of the drum, pusher ring and following bag support ring is limited by virtue of stop flange 47 engaging the bottom edge of enclosure ring 12. At this stage, the integrity of the seal is maintained by virtue of bag support ring 34A being in sealed leak-proof engagement with the inner periphery of enclosure ring 12 and the closed end bag 45 suspended from the support ring. Ring 34 is cut or broken and discarded with bag remnant 36 into bag 45 in drum 17 for storage with other contaminated waste material.

Figure 6:
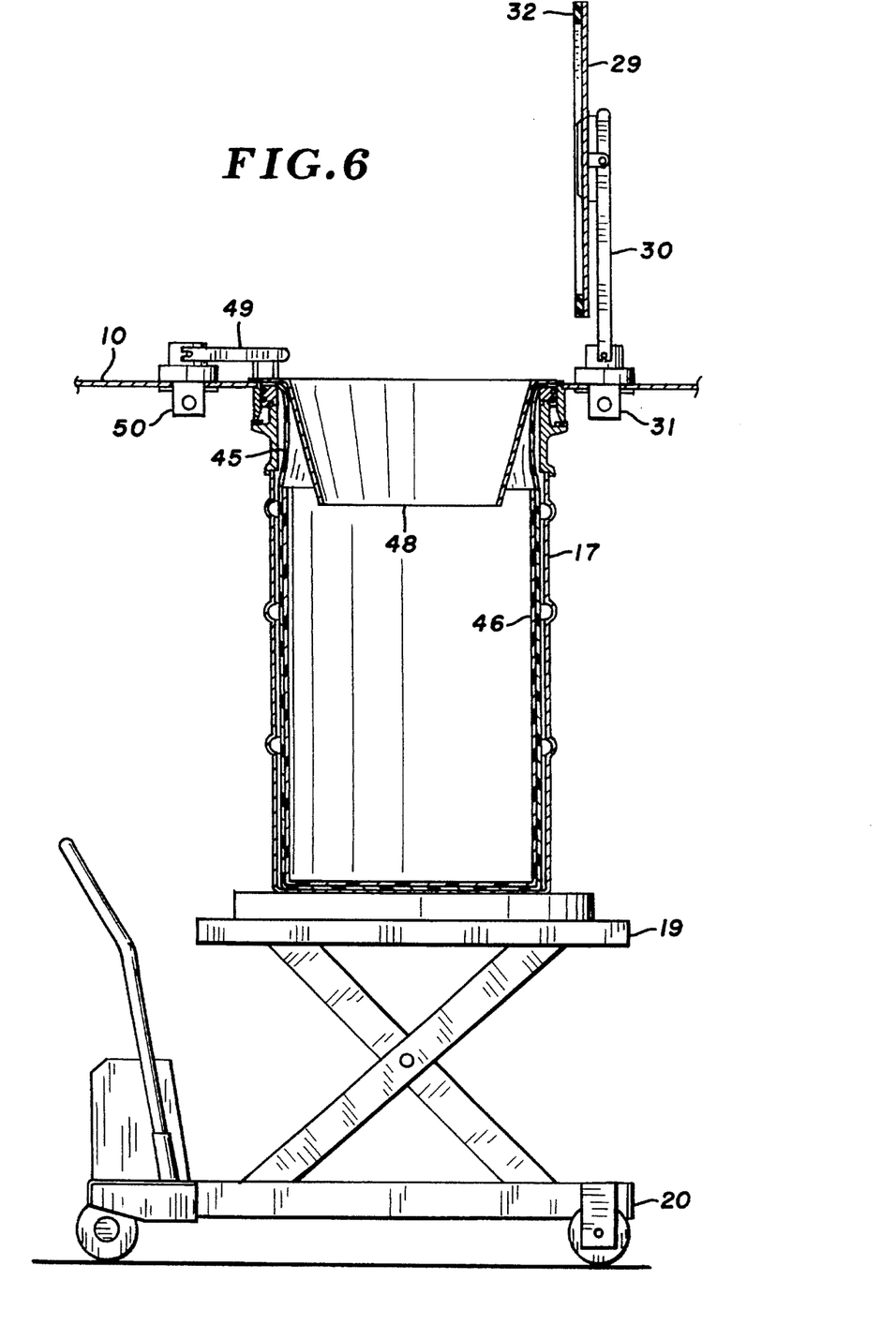
Figure 7:
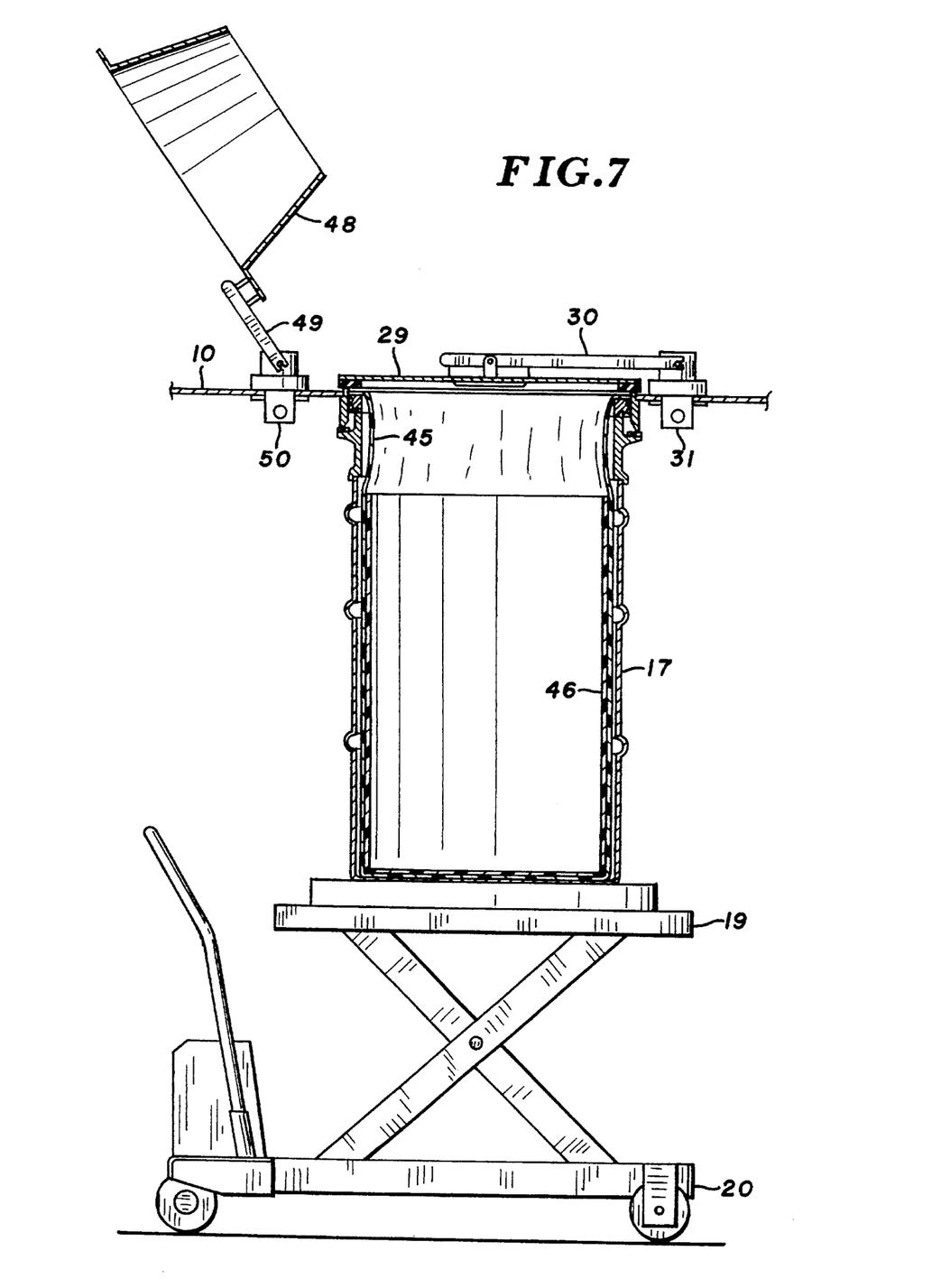

Referring now to FIG. 6, preferably an optional rigid or semi-rigid filler ring 48 is inserted through the port and into the top of bag 45. Filler ring 48 is supported within the port by an outwardly extending top flange which engages the periphery of the port. The filler ring helps preserve the integrity of the seal between the differing environments from accidental displacement of ring 34A and protects bag 45 from possible tears or abrasion from sharp or rough hazardous materials being transferred. Desirably filler ring 48 is pivotally supported from the ends of arms 49 which are actuated by filler ring drive 50 to move the filler ring from one position in place in the port to a second position out of the way of the transfer port, as shown in FIG. 7. Filler ring drive 50 is similar in all material respects to seal cover drive 31.

Referring now to FIG. 7, after the drum 17 is filled with hazardous material to be disposed of, filler ring 48 is removed by actuation of drive 50 and seal cover 29 is closed into leak-proof sealed engagement with the perimeter of the transfer port by actuation of drive 31.

Figure 8:
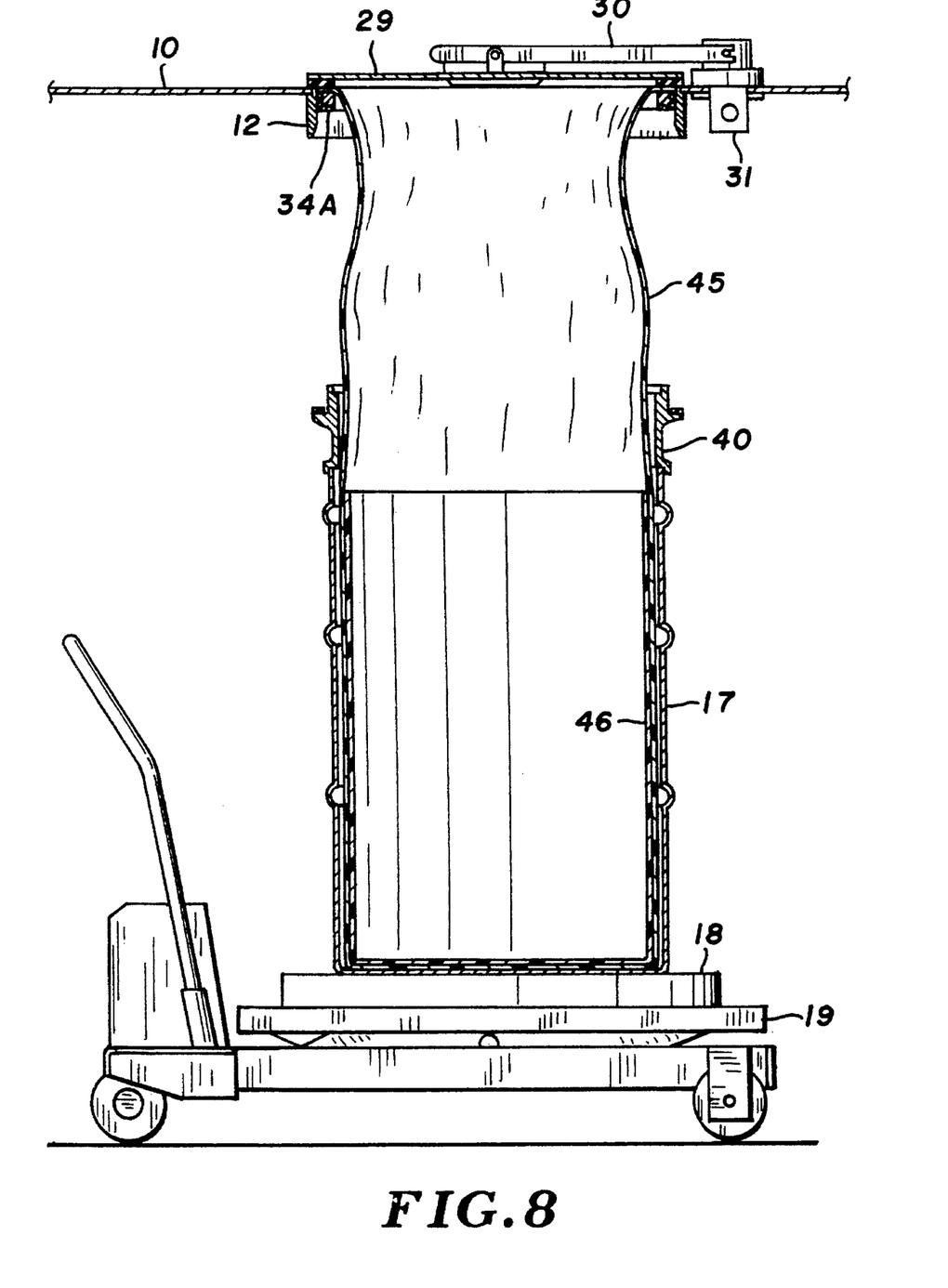

Referring now to FIG. 8, after closing of the transfer port by seal cover 29, the elevator platform 19 of lift cart 20 is lowered. When this occurs, bag 45 is stretched out to permit sealed closure of the bag. The bag includes sufficient slack to permit it to be twisted without dislodging ring 34A. Pusher ring 40 separates from bag support ring 34A which remains in place in sealed leak-proof relation with enclosure ring 12.

Figure 9:
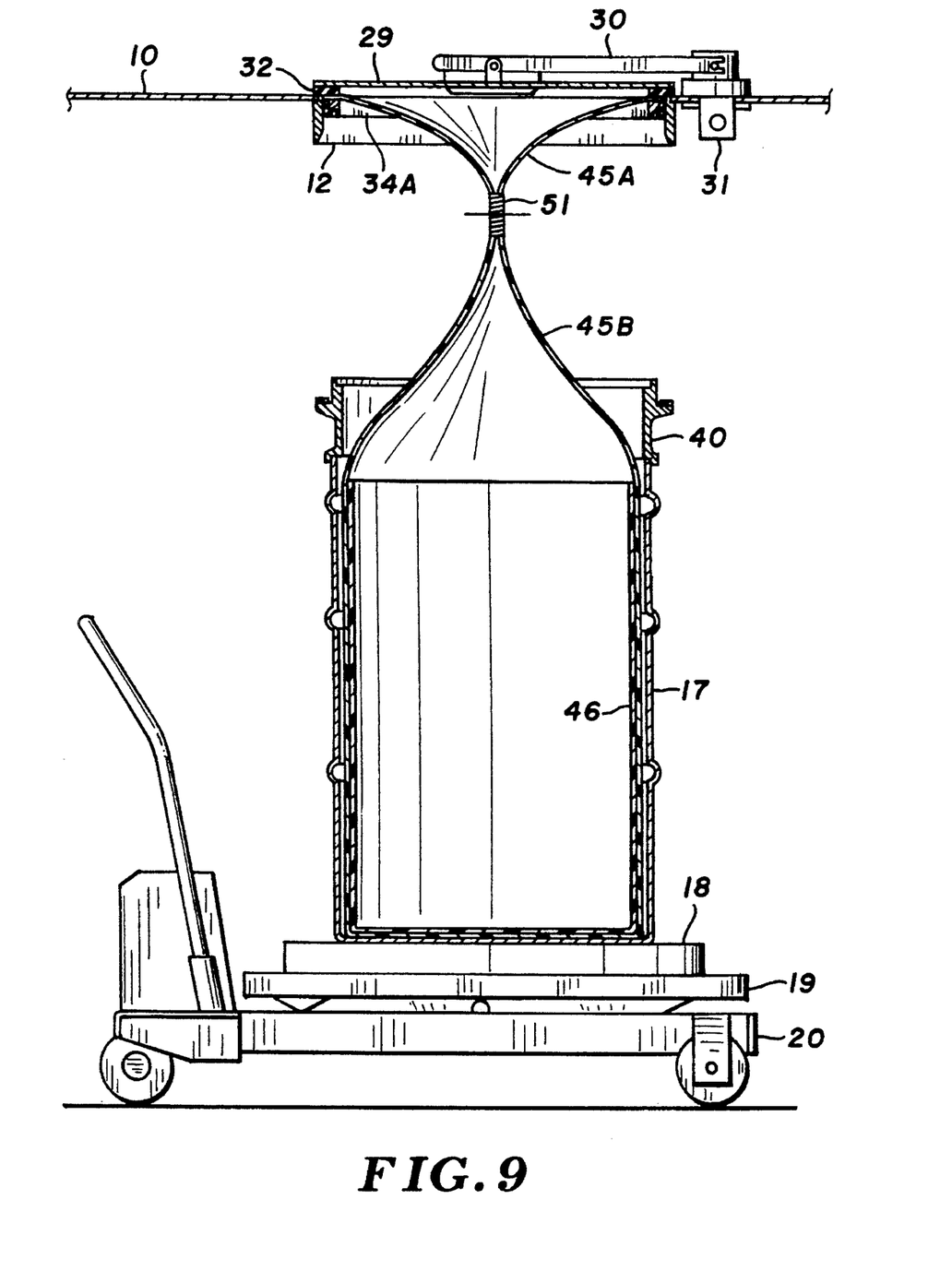

Referring now to FIG. 9, drum 17 is spun through several rotations on turntable 18 supported on the elevator platform 19 of lift cart 20. This results in the upper empty portion of bag 45 being twisted into a tight leak-proof seal 51 separating the upper bag portion 45A from the partially filled lower bag portion 45B. The twisted neck is clamped or sealed with adhesive tape and the twisted neck is then severed, leaving a leak-proof sealed closure on each of the bag segments. The drum 17 is then removed from the transfer site by the lift truck, pusher ring 40 is removed, the sealed upper end 45B of the bag is tucked into the drum and the drum is closed in the usual manner by replacing its top cover. The filled drum is then ready for transfer to a permanent storage site. A new drum is prepared by installation of the pusher ring on top of the drum and installation of a new bag, preferably with liner, within the drum and bag support ring mounted on the pusher ring. It is then installed in place underlying the transfer port and the transfer cycle is repeated.

The second or following bag support ring 34A then becomes the first or leading bag support ring for the next transfer cycle and the newly installed bag support ring becomes the second or following ring.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A sealed system for facilitating the safe transfer of hazardous material from a containment enclosure having a floor through a port in the floor of that containment enclosure to a storage container, said system comprising:

A) a vertically depending flange or enclosure ring surrounding and defining a circular port in the floor of a hazardous material containment enclosure, that port having an inner periphery and bottom edge;

B) a pivotally supported seal cover within said containment enclosure positionable for sealing engagement with the periphery of said port;

C) a storage container having an open top and a closed bottom positionable with its open top in precise axial alignment below said port;

D) elevator means supporting said storage container for upward and downward vertical movement toward and away from said port;

E) a rigid pusher ring having inside and outside surfaces and top and bottom edges and being supportable on the open top of said storage container and extending upward toward and, loosely engageable within the inside periphery of said flange ring;

F) a disposable semi-rigid synthetic resinous plastic bag supporting sealing ring on the top edge of said pusher ring, said sealing ring having top and bottom edges and being engageable in leak-proof sealed relation with the inner periphery of said flange ring upon elevation of the storage container;

G) an open top flexible elongated synthetic resinous plastic bag having a closed bottom positioned within said storage container, the open top of said bag extending loosely through said pusher ring and in leak-proof sealed engagement with said sealing ring; and H) means for closing the top of said bag in leak-proof sealed condition after transfer of hazardous material therein.

2. A transfer system according to claim 1 wherein a portion of said bag within the storage container contains a semi-rigid cylindrical plastic liner.

3. A transfer system according to claim 1 wherein:

A) each of said bag supporting sealing rings has at least one channel in its outer periphery;

B) the open top end of each of said plastic bags extends through and over the top of the sealing ring; and C) a compressible O-ring engageable with the inside surface of said flange ring in leak-proof sealed relation is fitted over the bag and seated in said channel.

4. A transfer system according to claim 1 wherein said elevator means is a scissors-type lift cart having a front and rear end and parallel opposite sides, and having a horizontal elevator platform.

5. A transfer system according to claim 4 wherein a turntable is supported on said elevator platform and said storage container is supported on said turntable.

6. A transfer system according to claim 4 wherein a rigid lift cart-aligning frame is provided below the port in the floor of the containment enclosure.

7. A transfer system according to claim 6 wherein said alignment frame comprises:

A) at least four vertical legs defining a rectangular cart-receiving area;

B) two of said legs defining an open front of said frame and being spaced to receive the sides of a lift cart with a slide fit;

C) two of said legs defining a closed rear of said frame and having a horizontal aligner plate secured therebetween and having a pair of forwardly projecting horizontally spaced apart ears engageable with the front end of said lift cart.

8. A transfer system according to claim 1 wherein:

A) said seal cover is provided with a peripheral gasket engageable in leak-proof sealed relation with the periphery of said circular port;

B) said seal cover is pivotally supported by one end of at least one arm, the opposite end of which is operatively connected to a remotely actuatable drive.

9. A transfer system according to claim 1 wherein a flanged filler ring is supported by the floor of said containment enclosure and extends through the sealing ring.

10. A transfer system according to claim 9 wherein:

A) said filler ring is pivotally supported from one end of an arm, the opposite end of which is operatively connected to a remotely actuatable drive.

11. A transfer system according to claim 1 wherein:

A) the bottom edge of each said bag supporting sealing rings is provided with an annular channel;

B) the top edge of said pusher ring is provided with a vertically extending lip engageable in the channel of a sealing ring;

C) said pusher ring is provided with a downwardly extending annular lip engageable with the top periphery of the storage container;

D) said pusher ring is provided with an annular stop flange projecting horizontally outwardly from the outer periphery of the pusher ring and having a top surface, said stop being located intermediate of the edges of said pusher ring and engageable with the bottom edge of the port flange ring to limit upward movement of said pusher ring and storage container; and E) the top surface of said stop flange is provided with a resilient sealing ring.

12. A transfer system according to claim 1 wherein said storage container is a standard 55 gallon steel drum.

13. A sealed system for facilitating the safe transfer of hazardous material from a containment enclosure having a floor through a port in the floor of that containment enclosure to a storage container, said system comprising:

A) a vertically depending flange or enclosure ring surrounding and defining a circular port in the floor of a hazardous material containment enclosure, that port having an inner periphery and bottom edge;

B) a pivotally supported seal cover within said containment enclosure positionable for sealing engagement with the periphery of said port;
   1) said seal cover being provided with a peripheral gasket engageable in leak-proof sealed relation with the periphery of said circular port; and
   2) said seal cover being pivotally supported by one end of at least one arm, the opposite end of which is operatively connected to a remotely actuatable motorized drive;

C) an open topped standard 55 gallon steel drum storage container positionable in precise axial alignment below said port;

D) a scissors-type lift cart having a front and rear end and parallel opposite sides and having a horizontal elevator platform supporting said storage container for upward and downward vertical movement toward and away from said port;

E) a rigid pusher ring having inside and outside surfaces and top and bottom edges and being supportable on the open top of said storage container and extending upward toward said flange ring, the outside surface of said pusher ring fitting loosely within the inside periphery of said flange ring;

F) an annular stop flange projecting horizontally outwardly from the outer periphery of the pusher ring intermediate of the edges of said pusher ring and having a top surface engageable with the bottom edge of the port flange ring, the top surface of said stop flange being provided with a resilient sealing ring;

G) a disposable semi-rigid synthetic resinous plastic bag supporting sealing ring on the top edge of said pusher ring, said sealing ring having top and bottom edges and inner and outer peripheries, and being engageable in leak-proof sealed relation with the inner periphery of said flange ring upon elevation of the storage container, having at least one channel in its outer periphery;

H) an open top flexible elongated synthetic resinous plastic bag having a closed bottom positioned within said storage container, the open top of said bag extending loosely through said pusher ring and through and over the top edge of the sealing ring in engagement with at least one channel in the outer periphery of the sealing ring, secured therein by a compressible O-ring which is engageable with the inside surface of said flange ring in leak-proof sealed relation;

I) a semi-rigid cylindrical plastic liner within said bag within the storage drum; and J) a turntable supported on said elevator platform and said storage container supported on said turntable for rotating the storage container for closing the top of said bag by twisting in leak-proof sealed condition after transfer of hazardous material therein.

14. A transfer system according to claim 13 wherein a rigid lift cart-aligning frame is provided below the port in the floor of the containment enclosure, said alignment frame comprising:

A) at least four vertical legs defining a rectangular cart-receiving area;

B) two of said legs defining an open front of said frame being spaced to receive the sides of a lift cart with a slide fit;

C) two of said legs defining a closed rear of said frame and having a horizontal aligner plate secured therebetween and having a pair of forwardly projecting horizontally spaced apart ears engageable with the front end of said lift cart.

15. A transfer system according to claim 13 wherein a flanged filler ring is supported by the floor of said containment enclosure and extends through the sealing ring, said filler ring being pivotally supported from one end of an arm, the opposite end of which is operatively connected to a remotely actuatable motorized drive.

16. A transfer system according to claim 13 wherein:

A) the bottom edge of each of said bag supporting sealing rings is provided with an annular channel;

B) the top edge of said pusher ring is provided with a vertically extending lip engageable in the channel of a sealing ring; and C) said pusher ring is provided with a downwardly extending annular lip engageable with the top periphery of the storage container.

17. A method for facilitating the safe transfer of hazardous material from a containment enclosure having a floor through a port in the floor of that containment enclosure to a storage container, said method comprising:

A) providing a containment enclosure having hazardous material therein, the floor of said enclosure having a circular port having an inner periphery and bottom edge defined by a vertically depending flange or enclosure ring, said port being closed by a pivotally supported seal cover within the containment enclosure in sealing engagement with the periphery of the port, and having a first disposable semi-rigid synthetic resinous plastic bag-supporting sealing ring in leak-proof sealed relation with the inner periphery of the flange and having an upper twisted closed end portion of a first synthetic resinous plastic bag supported therefrom;

B) providing an open topped storage container supported on an elevator means in precise axial alignment below said port, said container having a rigid pusher ring supported on the open top of the container and extending upward toward said flange ring, said pusher ring having inside and outside surfaces and top and bottom edges, the outside surface of said pusher ring fitting loosely within the inside periphery of said flange ring, and a second disposable semi-rigid synthetic resinous plastic bag-supporting sealing ring supported on the top edge of the pusher ring and having the open top of an elongated synthetic resinous second plastic bag having an open top and a closed bottom and being in leak-proof sealed relation with the said second sealing ring, the closed bottom of said bag extending to the bottom of the container;

C) opening said port by removing said seal cover;

D) elevating said storage container, pusher ring and second bag-supporting sealing ring whereby said second sealing ring displaces and replaces the first sealing ring in leak-proof sealed relation with said flange;

E) transferring hazardous material from the containment enclosure through the port into said second plastic bag;

F) closing said port with said seal cover;

G) lowering the container and pusher ring from said second sealing ring;

H) rotating said container and pusher ring to tightly twist the open uppermost end of said elongated second plastic bag, between the second sealing ring and pusher ring, into a leak-proof twisted closure;

I) securing said twisted closure and severing adjacent its mid-point into upper and lower twisted closure portions; and J) removing the pusher ring from the container, tucking the lower portion of the twisted closure into the storage container and closing the container.

18. A method according to claim 17 wherein a semi-rigid cylindrical plastic liner is placed within said second plastic bag prior to placing that bag within the storage container.

19. A method according to claim 17 wherein said pusher ring is provided with an outwardly projecting horizontal flange and said flange sealingly engages the bottom edge of said port flange ring.

20. A method according to claim 17 wherein pressure sensitive adhesive tape is wrapped around said twisted closure to secure the same.

21. A sealed system for facilitating the safe transfer of hazardous material from a containment enclosure having a floor to a storage container, said system comprising:

A) a circular port in the floor of a hazardous material containment enclosure; that port having an inner periphery;

B) a pivotally supported seal cover within said containment enclosure positionable for sealing engagement with the periphery of said port;

C) a circular flange ring surrounding said port, said flange ring extending downwardly from the floor of said containment enclosure and having an inner periphery;

D) a storage container having an open top and a closed bottom positionable with its open top in precise axial alignment below said port;

E) elevator means supporting said storage container for upward and downward vertical movement toward and away from said port;

F) a rigid ring having inside and outside surfaces and top and bottom edges and being supportable on the open top of said storage container, the top edge of said ring extending upward toward said flange ring with its outside surface engageable within the inside periphery of the flange ring and in leak-proof sealed engagement with the periphery of said port; and G) means for closing the top of said container in leak-proof sealed condition after transfer of hazardous material therein.

22. A transfer system according to claim 21 wherein said elevator means is a scissors-type lift cart having a horizontal elevator platform.

23. A transfer system according to claim 22 wherein a rigid lift cart-aligning frame is provided below the port in the floor of the containment enclosure.

24. A transfer system according the claim 21 wherein:

A) said seal cover is provided with a peripheral gasket engageable in leak-proof sealed relation with the periphery of said circular port;

B) said seal cover is pivotally supported by one end of at least one arm, the opposite end of which is operatively connected to a remotely actuatable drive.

25. A transfer system according to claim 21 wherein a flanged filler ring is supported by the floor of said containment enclosure and extends through the circular port, said filler ring being pivotally supported from one end of an arm, the opposite end of which is operatively connected to a remotely acutatable drive.

* * * * *